Figure 1:
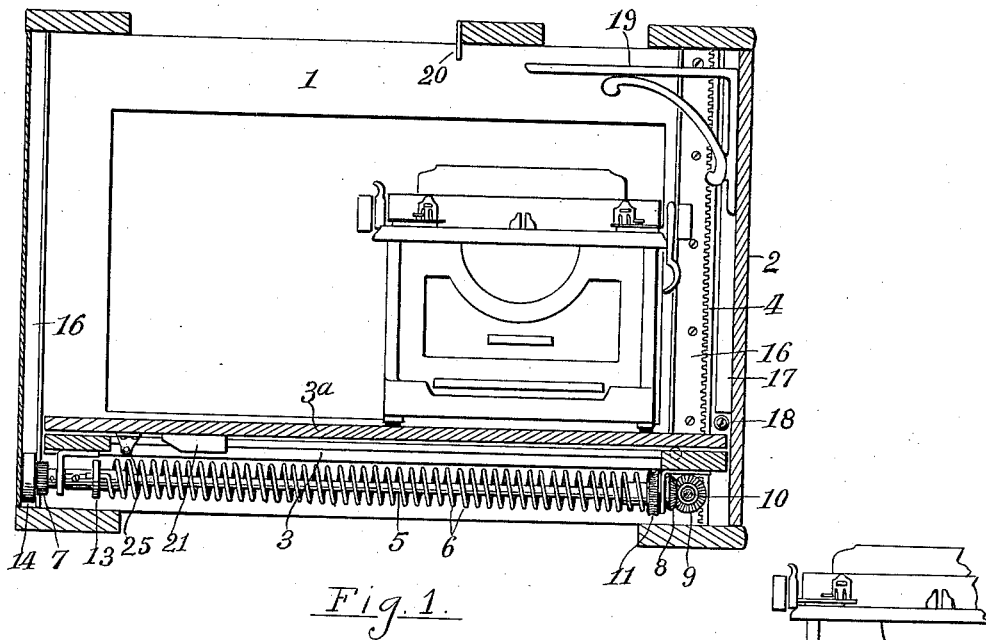

F. E. McLEAN.
CABINET FOR TYPE WRITING, ADDING, PRINTING, OR OTHER ANALOGOUS MACHINES.
APPLICATION FILED JUNE 7, 1912.

1,093,344.  Patented Apr. 14, 1914.
4 SHEETS—SHEET 1.

Witnesses
Harold O. Van Antwerp
Mae Rankin

Inventor
Frank E. McLean.
By Luther V. Moulton
Attorney

F. E. McLEAN.
CABINET FOR TYPE WRITING, ADDING, PRINTING, OR OTHER ANALOGOUS MACHINES.
APPLICATION FILED JUNE 7, 1912.

1,093,344.

Patented Apr. 14, 1914.

4 SHEETS—SHEET 2.

Witnesses
Harold O. Van Antwerp
Mae Rankin

Inventor
Frank E. McLean
By Luther V. Moulton
Attorney

F. E. McLEAN.
CABINET FOR TYPE WRITING, ADDING, PRINTING, OR OTHER ANALOGOUS MACHINES.
APPLICATION FILED JUNE 7, 1912.

1,093,344.

Patented Apr. 14, 1914.

4 SHEETS—SHEET 3.

Witnesses
Harold O. Van Antwerp
Mae Rankin

Inventor
Frank E. McLean
By Luther V. Moulton
Attorney

F. E. McLEAN.
CABINET FOR TYPE WRITING, ADDING, PRINTING, OR OTHER ANALOGOUS MACHINES.
APPLICATION FILED JUNE 7, 1912.

1,093,344.

Patented Apr. 14, 1914.

4 SHEETS—SHEET 4.

Witnesses

Inventor
Frank E. McLean
By Luther V. Moulton
Attorney

UNITED STATES PATENT OFFICE.

FRANK E. McLEAN, OF MUSKEGON, MICHIGAN, ASSIGNOR OF ONE-HALF TO RICHARD H. BROWNE, OF MUSKEGON, MICHIGAN.

CABINET FOR TYPE-WRITING, ADDING, PRINTING, OR OTHER ANALOGOUS MACHINES.

1,093,344. Specification of Letters Patent. Patented Apr. 14, 1914.

Application filed June 7, 1912. Serial No. 702,216.

*To all whom it may concern:*

Be it known that I, FRANK E. McLEAN, a citizen of the United States of America, residing at Muskegon, in the county of Muskegon and State of Michigan, have invented certain new and useful Improvements in Cabinets for Type-Writing, Adding, Printing, or other Analogous Machines; and I do hereby declare the following to be a full, clear, and exact description of the invention, such as will enable others skilled in the art to which it appertains to make and use the same.

My invention relates to improvements in cabinets for typewriting, adding, printing or other analogous machines and its object is to provide the same with improved means for movably supporting the machine, to provide improved means for counterbalancing the device and for locking the same in various positions, and to provide the device with various new and useful features hereinafter more fully described and particularly pointed out in the claims.

Figure 2:
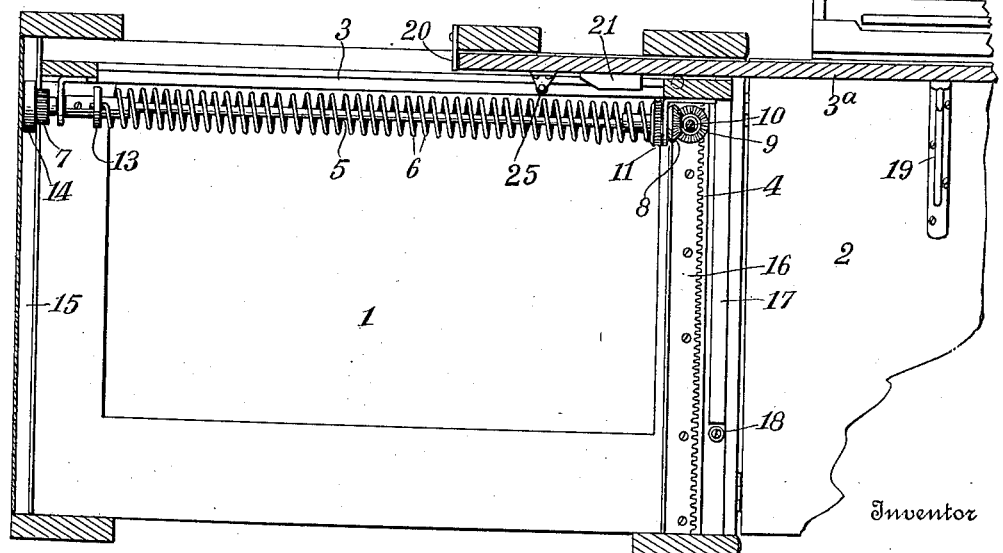
Figure 3:
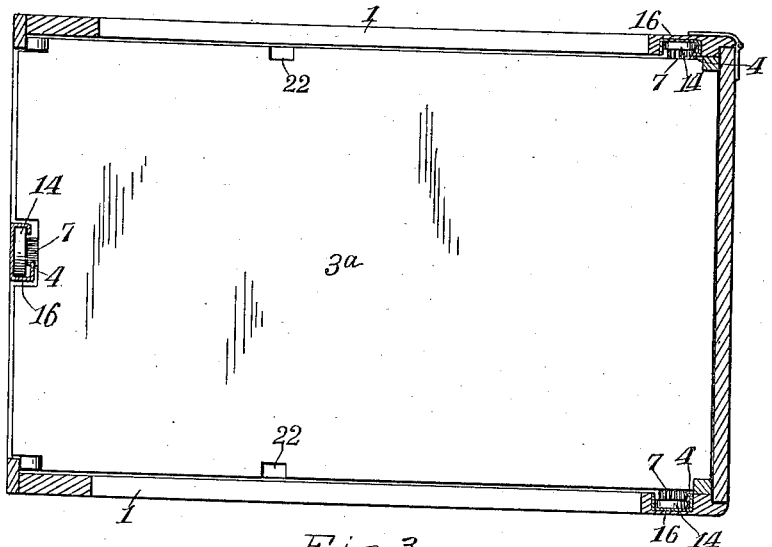
Figure 4:
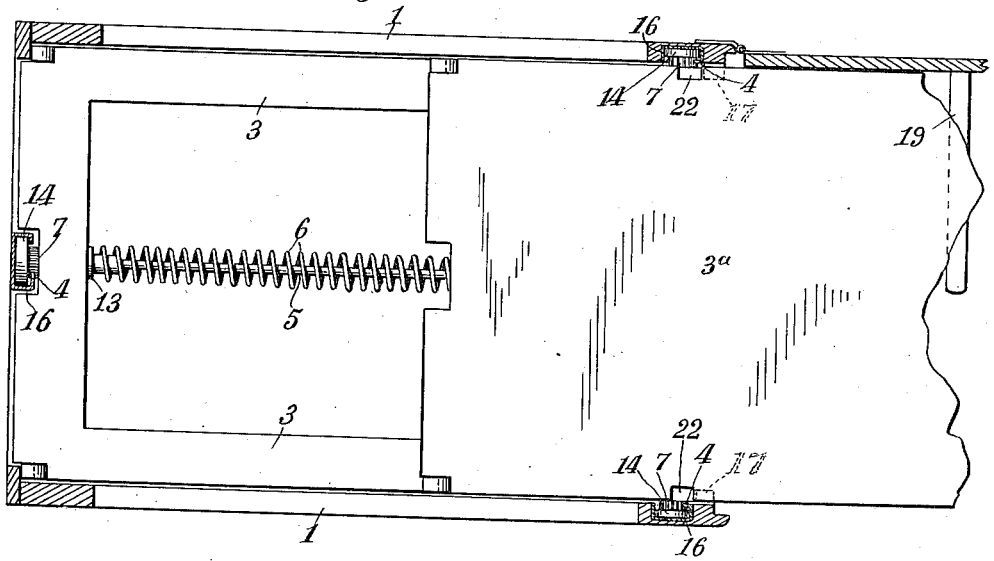
Figure 5:
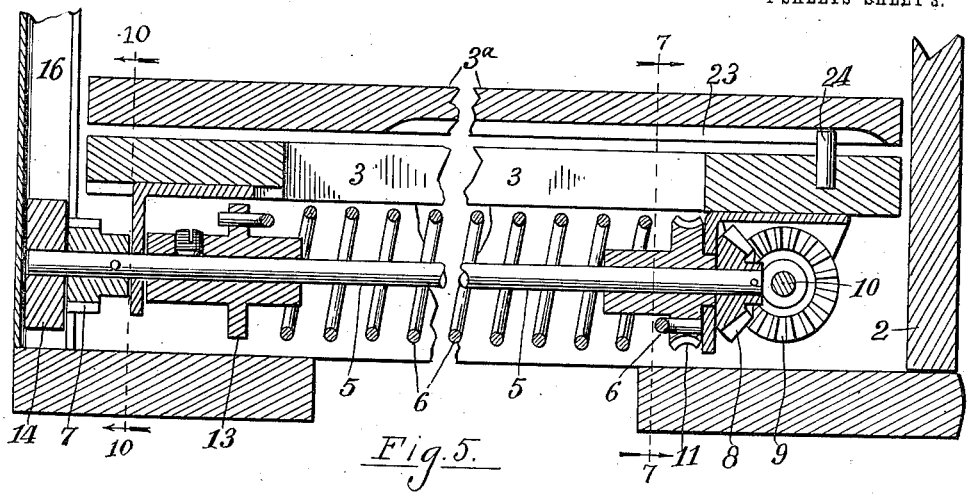
Figure 6:
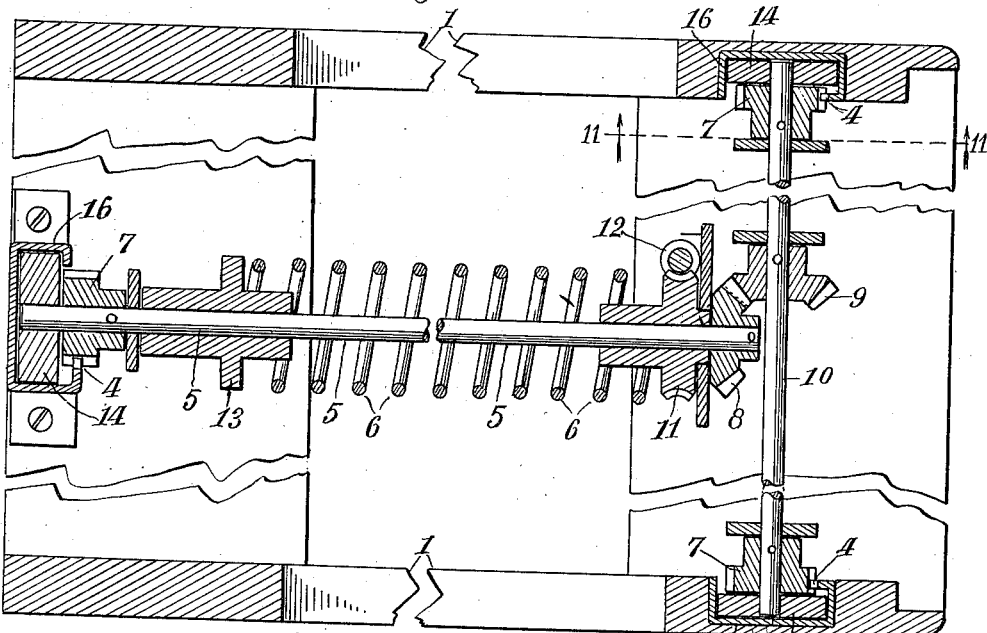
Figure 7:
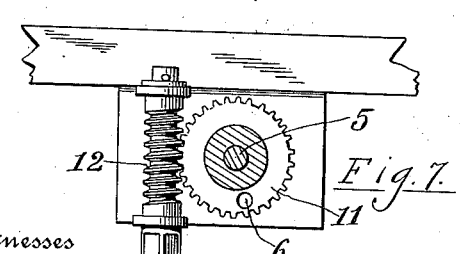
Figure 8:
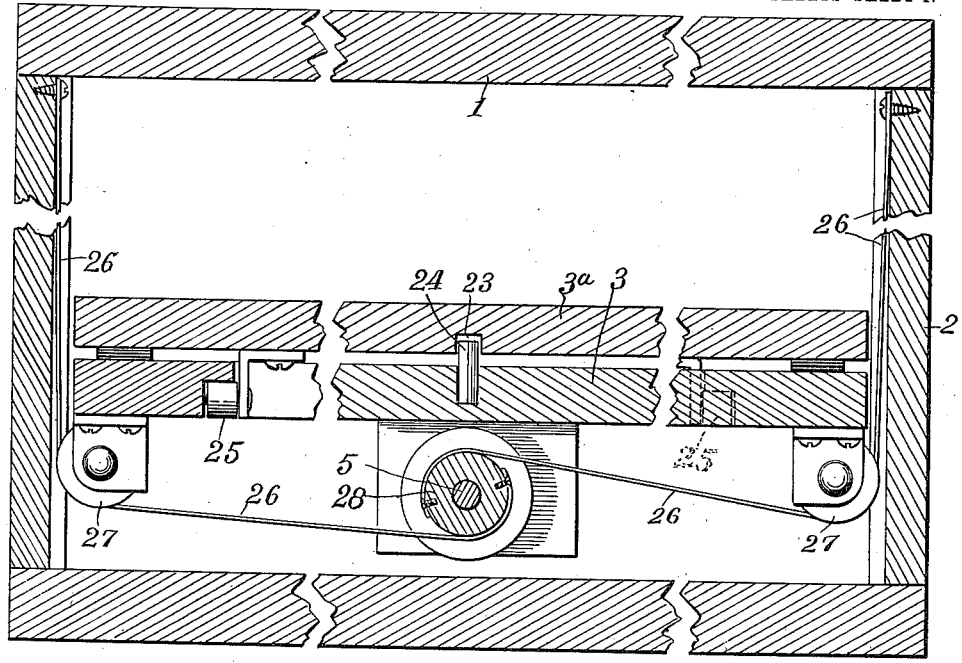
Figure 10:
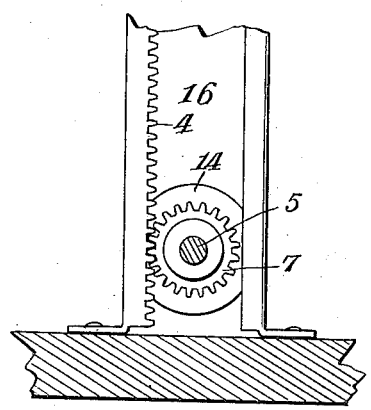
Figure 9:
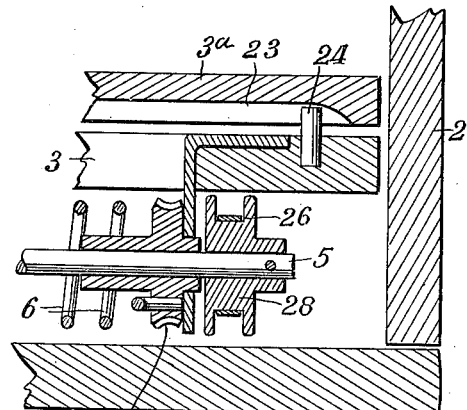
Figure 11:
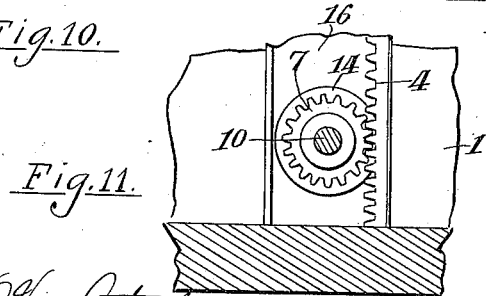

My invention consists essentially of a suitable case, a vertically movable frame or elevator arranged within the case, a longitudinally movable table mounted on the elevator to carry the machine, said table being adapted to be projected outside of the case, balancing and supporting means for raising and lowering the elevator, preferably consisting of a spring actuated shaft, supporting means carrying the elevator and operated by the shaft, whereby the machine table and elevator are counterbalanced and easily moved, means for holding the parts in open or closed positions, and in various features of construction and arrangement as will more fully appear by reference to the accompanying drawings, in which:

Figure 1 is a longitudinal vertical section of a device embodying my invention shown in closed position; Fig. 2 the same shown in open position with portions broken away; Fig. 3 a horizontal section showing the table in plan view and in closed position; Fig. 4 the same in open position and partially broken away; Fig. 5 an enlarged detail in vertical section showing a portion of the supporting mechanism for the elevator; Fig. 6 a plan view of the same shown in horizontal section in the plane of the axis of the shafts; Fig. 7 a detail of the worm and gear for adjusting the tension of the spring; Fig. 8 a modification of the device shown in vertical section, with parts broken away; Fig. 9 a detail in vertical section shown at right angles to Fig. 8; Fig. 10 a detail in elevation of the rear rack and pinion; and Fig. 11 the same of one of the front rack and pinions.

Like numbers refer to like parts in all of the figures.

1 represents a case of any convenient construction the case shown being adapted to form one member of a sectional pedestal to a desk which obviously may be otherwise constructed as preferred. 2 a front door to the same adapted to swing open out of the way of the table.

3 is a horizontally disposed rectangular frame constituting an elevator to carry the table 3ª upon the front part of which the typewriter or other machine is supported. This table extends inward beyond the machine a sufficient distance so that when extended the machine will be suitably located outside of the case and the table extend suitably within the case and overlap the elevator. The inner end of the table is held down by underrunning rollers 25 traversing the side rails of the elevator frame. At each side of the front end of the same and the middle of the rear of the same are vertically disposed racks 4 fixed on the inner side of the case. Extending beneath the middle of the elevator from front to rear is a rotative shaft 5 mounted in suitable bearings fixed on the elevator. Coiled around this shaft is a spring 6 one end of which is secured to a collar 13 fixed on the shaft and the other end secured to a worm gear 11 journaled on the shaft. This gear is held by a worm 12 and by turning this worm with a suitable key the tension of the spring 6 may be adjusted at pleasure. This spring tends to rotate the shaft in a direction suitable for raising the elevator and when properly tensioned balances the movable parts of the device and the machine thereon so that the same moves up or down freely.

The supporting means for the elevator consists preferably of pinions 7 engaging the racks 4, the pinions 7 being mounted on the respective ends of a transverse shaft 10 and the rear end of the shaft 5. The shafts are connected by bevel gears 8 and 9 whereby all of the pinions rotate simultaneously and in the same direction thus traversing the racks and maintaining the elevator level at all times and by the action of the spring 6 the weight of the elevator, table and machine is counterbalanced.

To guide the elevator, the rear end of the shaft 5 and the ends of the shaft 10 are each provided with rollers 14 arranged to traverse vertical ways 16, these ways preferably being each formed of sheet metal folded in channel shape, one flange of which is extended inward toward the respective shaft and provided with teeth to form the rack 4 to engage the respective pinion.

The table is preferably mounted on rollers to run freely to and fro longitudinally on the elevator and is provided near the rear with the underrunning rollers 25 to hold the rear end down when the table is projected outward from the elevator. The table is also provided with a longitudinal groove 23 and a guide pin 24 is fixed in the elevator and slidably engages this groove, whereby the table is properly guided to and fro upon the elevator.

To hold the device in lowered or raised position a guide strip 17 is provided at each side of the front opening of the case projecting into the path of the table. When the table is lowered this guide strip is above the front corner of the same and holds the table and elevator in lowered position, a friction roller 18 preferably being used at the end of the guide strip to insure free running of the table. The table is provided at a proper place in each side with a recess 22 adapted to receive the respective guide strip 17 when the table is moved out the proper distance, which is limited by a stop 21 on the bottom of the table to engage the front member of the elevator. The elevator and table can then be freely raised to the top of the case as shown in Fig. 2 and by moving the table inward by about the width of the guide strip the same will be under the table and hold it in elevated position. A stop 21 is provided to prevent further inward movement of the table when raised. The typewriter will thus be securely held in the proper position for use and properly supported. The bracket 19 on the door being swung under the table further adds to the supporting means.

In the modified form shown in Figs. 8 and 9, the racks and pinions at the front, the bevel gears, and the transverse shaft, are displaced by a cheaper structure which serves the same purposes, consisting of a winding drum 28 on the shaft 5 in place of the bevel gear 8, two steel tapes 26 oppositely wound on this drum and extending oppositely beneath supporting rollers 27 on the elevator, and thence upward at each side of the same, being secured at the upper ends to the sides of the case near the top thereof. The drum 28 is of such diameter as to wind the steel tapes at about the same rate that the pinion 7 at the rear traverses the rack. The typewriter on the projecting front end of the table being liable to overbalance and raise the rear of the elevator, I prefer to retain the rack and pinion mechanism at the rear and thus positively control the rear of the elevator, the tapes, however, being sufficient at the front for the reason they carry a load at all times and the elevator has no tendency to rise at this end.

Obviously the typewriting machine forms no part of the invention and is mentioned to illustrate the invention, an adding machine, printing machine or any other suitable device may be placed on the described table as occasion may arise without departing from the invention.

What I claim is:—

1. A cabinet comprising a case, an elevator vertically movable within the case, a horizontally movable table carried by said elevator and adapted to project outside the case, the table having recesses in its margin, guide elements adapted to engage said recesses as the table traverses vertically on the elevator, said elements also engaging the table to hold the same when elevated or lowered.

2. A cabinet, comprising a case, an elevator vertically movable in the case, means for balancing the elevator and the load thereon, a table slidably interlocked with and horizontally movable on the elevator and adapted to project outside the case at one end, and means for locking the elevator in raised position under the influence of the movement of the table to its projected position outside the case.

3. A cabinet, comprising a case, an elevator vertically movable in the case, a table horizontally movable on the elevator, a spring-actuated shaft journaled on the elevator, means for raising the front end of the elevator, operated by the shaft, a rack at the rear of the case and a pinion on the shaft traversing the rack.

4. A cabinet, comprising a case, an elevator vertically movable in the case, a table horizontally movable on the elevator, a shaft journaled on the elevator, a spring to rotate the shaft, means for adjusting the tension of the spring, means for supporting and raising the elevator operated by the shaft, the means at the rear of the elevator also adapted to prevent the rear end of the elevator from rising in advance of the front end of the same.

5. A cabinet, comprising a case, an elevator vertically movable in the case, a table horizontally movable on the elevator, a longitudinal shaft and a transverse shaft journaled on the elevator, miter gears connecting the shafts, a spring to rotate the shafts, means for adjusting the tension of the spring, vertical racks in the case, and pinions on the shafts engaging the racks to raise and lower the elevator.

6. A cabinet, comprising a case, an elevator vertically movable in the case, a table horizontally movable on the elevator, means for locking the elevator in raised position operated by movement of the table, vertical racks in the case, pinions engaging the racks, shafts journaled on the elevator and carrying the pinions, a spring to operate the shafts and means for adjusting the tension of the spring.

7. A cabinet, comprising a case, vertical ways and racks in the case, guide rollers traversing the ways, pinions traversing the racks, shafts journaled on the elevator and carrying the pinions, a spring to rotate the shafts, and means for adjusting the tension of the spring.

8. A cabinet, comprising a case, an elevator vertically movable in the case, sheet metal ways of channel form in the case each having an inturned flange provided with a rack, guide rollers traversing the ways, pinions engaging and traversing the racks, shafts on which the pinions are mounted, gears connecting the shafts, a spring to operate the shafts, and means for adjusting the tension of the spring.

9. A cabinet, comprising a case, an elevator vertically movable in the case, a longitudinal shaft and a traverse shaft journaled on the elevator, miter gears connecting the shafts, a spring surrounding the longitudinal shaft, a collar fixed on the shaft to which one end of the spring is attached, a worm gear in which the shaft is rotative and to which the other end of the spring is attached, a worm engaging the gear, pinions and guide rollers carried on the shafts, the pinions being fixed thereon, ways traversed by the guide rollers and racks traversed by the pinions.

10. A cabinet, comprising a case, an elevator vertically movable in the case, means for balancing the elevator and controlling the movements thereof, a table horizontally movable on the elevator and having recesses in its margin, guide strips adapted to engage said recesses as the table traverses vertically, said strips also engaging the table to hold the same when elevated or lowered, and a stop to engage the table when raised and moved to engage the upper end of the guide strips.

11. A cabinet, comprising a case, an elevator vertically movable in the case, means for balancing and guiding said elevator, a table horizontally movable on the elevator, a stop to limit the outward movement of the table on the elevator, a stop to limit the inward movement of the table when the elevator is raised, guide strips adapted to engage recesses in the edges of the table and also adapted to engage the under side of the table to hold the same in raised position.

12. A cabinet, comprising a case, having a front opening, a door to close said opening, a bracket on the inner side of the door, a vertically movable elevator in the case, a horizontally movable table mounted on the elevator engaged and supported by the bracket when the elevator is raised and the table moved outward, and means for counterbalancing the elevator.

In testimony whereof I affix my signature in presence of two witnesses.

FRANK E. McLEAN.

Witnesses:
   EDNA E. NELSON,
   SOPHIA A. LUND.

---

Copies of this patent may be obtained for five cents each, by addressing the "Commissioner of Patents, Washington, D. C."